United States Patent [19]

Klecka

[11] Patent Number: 4,517,170

[45] Date of Patent: May 14, 1985

[54] REMOVAL OF H₂S FROM SOUR GAS STREAMS WITH SUBSEQUENT SULFUR SEPARATION

[75] Inventor: Miro E. Klecka, Houston, Tex.

[73] Assignee: Shell Oil Company, Houston, Tex.

[21] Appl. No.: 451,706

[22] Filed: Dec. 20, 1982

[51] Int. Cl.³ .................... C01B 17/05; B01D 53/34
[52] U.S. Cl. ................................ 423/573 R; 423/226
[58] Field of Search .................. 423/224, 226, 567 R, 423/573 G, 573 R, 578 A, 578 R

[56] References Cited

U.S. PATENT DOCUMENTS

| | | | |
|---|---|---|---|
| 3,068,065 | 12/1962 | Hartley et al. | 423/228 |
| 3,933,993 | 1/1976 | Salemme | 423/226 |
| 4,009,251 | 2/1977 | Meuly | 423/573 |
| 4,243,648 | 1/1981 | Fenton | 423/573 R |
| 4,390,516 | 6/1983 | Blytas | 423/573 |
| 4,402,930 | 9/1983 | Diaz | 423/573 |
| 4,414,194 | 11/1983 | Blytas | 423/573 G |

FOREIGN PATENT DOCUMENTS 2437863 10/1978 France .......................... 423/226

Primary Examiner—Earl C. Thomas
Attorney, Agent, or Firm—Albert J. Adamcik

[57] ABSTRACT

A cyclic process for the removal of H₂S from a sour gaseous stream is disclosed, the process being characterized by the reaction of the H₂S to sulfur employing aqueous solutions of oxidizing polyvalent metal chelates of nitrilotriacetic acid, and by the recovery of the sulfur from the solutions with specific extractants. The extractants are selected from compounds (and mixtures thereof) having the formula $C_nH_{2(n+1)}$, wherein n is a whole number from 4 through 8, and the recovery may be made prior or subsequent to regeneration of the polyvalent metal chelate solution.

24 Claims, 2 Drawing Figures

REMOVAL OF H₂S FROM SOUR GAS STREAMS WITH SUBSEQUENT SULFUR SEPARATION

BACKGROUND OF THE INVENTION

The presence of significant quantities of $H_2S$ and $CO_2$ in various "sour" industrial gaseous streams poses a persistent problem. Although various procedures have been developed to remove and recover these contaminants, most such processes are deficient, for a variety of reasons.

In one cyclic method currently attracting attention, the sour gas is contacted, preferably with a solvent-reactant system which comprises an aqueous regenerable reactant, to produce solid free sulfur which is recovered either prior or subsequent to regeneration of the reactant. Suitable reactant materials include polyvalent metallic ions, such as iron, vanadium, copper, manganese, and nickel, and include polyvalent metal chelates. Preferred reactants are coordination complexes in which the polyvalent metals form chelates with specified organic acids.

It has been found that the stability of some reactants employed is temperature dependent, i.e., if the temperature of the solutions is too high, some of the reactants tend to degrade or decompose. In particular, if temperatures above the melting point of sulfur are employed, some systems, such as particular iron chelate systems, tend to decompose.

On the other hand, if a solvent is employed to extract the sulfur from the solution, problems may arise if the solvent exhibits significant solubility in the solution, the gas treated, or the product sulfur. Thus, a need has existed for a gas treating system which would avoid the problems mentioned.

SUMMARY OF THE INVENTION

Accordingly, the invention relates to a process for the removal of $H_2S$ from gas streams in which the sulfur produced is extracted from a specified reactant admixture or solution and then removed as further described. More particularly, the invention, in one embodiment, relates to a process for the removal of $H_2S$ from a sour gaseous stream comprising: contacting the sour gaseous stream in a contacting zone with an aqueous reaction solution at a temperature below the melting point of sulfur, the mixture comprising an effective amount of an oxidizing polyvalent metal chelate or mixture of such metal chelates, of nitrilotriacetic acid, to produce a sweet gas stream and an aqueous admixture containing sulfur and reduced reactant; removing aqueous admixture from the contacting zone; contacting aqueous admixture in an extraction zone with a liquid composition selected from compounds having the formula $C_nH_{2(n+1)}$, wherein n is a number from 4 through 8, and mixtures thereof, in an amount sufficient to remove at least the bulk of the sulfur from said admixture and form a separate mass containing solid sulfur and said liquid composition, and forming in said extraction zone an upper mass containing solid sulfur and said liquid composition, and a lower phase in contact with the lower portion of said upper mass, said lower phase comprising aqueous admixture containing reduced reactant; separating at least a portion of the upper mass, said portion containing solid sulfur, and recovering sulfur from the portion separated; separating aqueous admixture from the lower phase, and regenerating separated aqueous admixture in a regeneration zone to produce an aqueous admixture containing a regenerated reactant; and returning aqueous admixture from the regeneration zone to the contacting zone. As used herein, the term "upper mass containing solid sulfur and said liquid composition", and variants thereof, is understood to include a slurry or slurry-like mixture of the liquid composition and sulfur, as well as the case of a significant body or layer of the liquid composition disposed above the slurry or slurry-like mixture of the composition and sulfur.

In another embodiment of the invention, the sulfur recovery is accomplished after regeneration of the reactant admixture or solution. More particularly, in this embodiment, the invention comprises a process for the recovery or removal of $H_2S$ from a sour gaseous stream comprising contacting the sour gaseous stream in a contacting zone with an aqueous reaction solution at a temperature below the melting point of sulfur, the mixture comprising an effective amount of an oxidizing polyvalent metal chelate of nitrilotriacetic acid, or mixture of such polyvalent metal chelates of nitrilotriacetic acid, to produce a sweet gas stream and an aqueous admixture containing sulfur and reduced reactant; removing aqueous admixture from the contacting zone, and regenerating the aqueous admixture to produce a regenerated aqueous admixture containing a regenerated reactant and sulfur; contacting regenerated aqueous admixture in an extraction zone with a liquid composition selected from compounds having the formula $C_nH_{2(n+1)}$, wherein n is a whole number from 4 through 8, and mixtures thereof, in an amount sufficient to remove at least the bulk of the sulfur from said regenerated aqueous admixture and form a separate mass containing solid sulfur and said liquid composition, and forming in said extraction zone an upper mass containing solid sulfur and said liquid composition, and a lower phase in contact with the lower portion of said upper mass, said lower phase comprising regenerated aqueous reaction solution; separating at least a portion of the upper mass, said portion containing solid sulfur, and recovering sulfur from the portion separated; separating regenerated aqueous reaction solution from the lower phase, and returning regenerated aqueous reaction solution to the contacting zone. In each embodiment, at least a portion of the liquid composition is recovered from the upper mass and is preferably returned to the extraction zone.

If desired, the sulfur-containing admixture from the contacting zone (or from the regeneration zone) may be separated into two portions, a portion or stream having reduced sulfur content, and a portion or stream containing increased sulfur content, preferably a slurry. The manner of separation is a matter of choice, and equipment such as a centrifugal separator may be employed. It is not necessary that absolutely all sulfur be removed on a continuous basis in the process; the process may suitably be operated with a very minor inventory or significantly reduced content of sulfur in the system. In general, whether the sulfur is separated prior to or after regeneration is a matter of choice, the important aspect being the use of the compositions specified. If a limited volume of the sulfur-containing admixture or a "slurry" is contacted with the extractant, the "slurry" or concentrated stream will preferably comprise from about 2 percent to about 30 percent, by volume, (on a continuous basis) of the total stream from the contact or regeneration zone.

Accordingly, the invention substantially reduces the possibility of reactant degradation by extracting the sulfur effectively. As noted, the invention provides for the formation of a three-phase mass containing, in the upper portion or mass, solid sulfur and the liquid compound or compounds mentioned, and a lower phase, in contact therewith, containing aqueous admixture. It has been found, surprisingly, that the compounds described exhibit the ability to extract the sulfur from the aqueous admixture. The upper mass, or a portion thereof containing sulfur, may then be removed, preferably continuously, and the sulfur recovered, e.g., by heating the mass or the portion and melting the sulfur to effect a separation. If a significant upper layer of liquid composition is present in the extraction zone, it may simply be decanted, for reuse, if desired. Concomitantly, in the first embodiment, the lower phase, or a portion thereof, may then be separated, again preferably continuously, and the reactant therein regenerated, preferably, by contacting the admixture in a regeneration zone or zones with oxygen. Other types of regeneration, such as electrolytic or electrochemical regeneration, may be employed (in both embodiments). In the second embodiment, the lower phase is preferably returned to the contacting zone. As used herein, the term "oxygen" includes oxygen-containing gases, air or air-enriched with oxygen. If oxygen is employed, the oxygen oxidizes the reduced metal ions or the metal of the chelate or chelates to a higher valence state, and the regenerated mixture may be returned to the contact zone. The oxygen (in whatever form supplied) is supplied in a stoichiometric equivalent or excess with respect to the amount of reactant present in the mixture. Preferably, the oxygencontaining gas is supplied in an amount of from about 1.2 to 3 times excess.

DETAILED DESCRIPTION OF THE INVENTION

Figure 1:
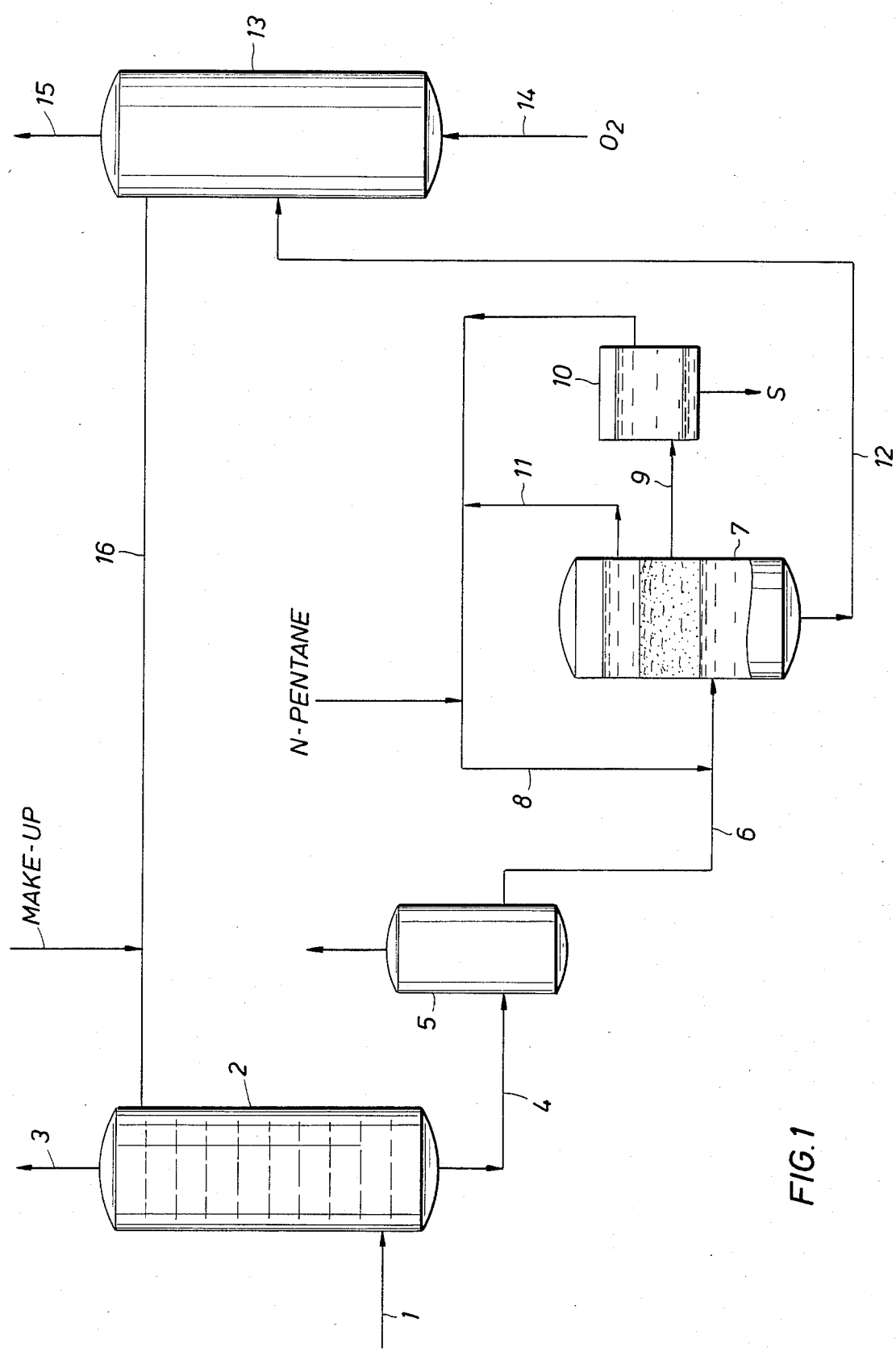

The particular type of gaseous stream treated is not critical, as will be evident to those skilled in the art. Streams particularly suited to removal of $H_2S$ by the practice of the invention are, as indicated, naturally occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having a low ratio of $H_2S$ to $CO_2$, and other gaseous hydrocarbon streams. The term "hydrocarbon stream(s)", as employed herein, is intended to include streams containing significant quantities of hydrocarbon (paraffinic, naphthenic, and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume or greater. Obviously, the amount of $H_2S$ present is not generally a limiting factor in the practice of the invention.

The temperatures employed in the contacting zone are not generally critical, except that the reaction is carried out at a temperature below the melting point of sulfur. In many commercial applications, such as the removal of $H_2S$ from natural gas to meet pipeline specifications, contacting at ambient temperatures is desired, since the cost of refrigeration would exceed the benefits obtained due to increased absorption at the lower temperature. In general, temperatures of from 10° C. to 80° C. are suitable, and temperatures from 20° C. to 45° C. are preferred. Contact times may range from about 1 second to about 270 seconds or longer, with contact times of 2 seconds to 120 seconds being preferred. Temperatures employed in the extraction zone will approximate those in the contacting zone, except that they will always be below the melting point of sulfur.

Similarly, in the regeneration or stripping zone or zones, temperatures may be varied widely. Preferably, the regeneration zone should be maintained at substantially the same temperature as the absorption zone. If heat is added to assist regeneration, cooling of the absorbent mixture is required before return of the absorbent mixture to the absorption zone. In general, temperatures of from about 10° C. to 80° C., preferably 20° C. to 45° C. may be employed.

Pressure conditions in the contacting or absorption zone may vary widely, depending on the pressure of the gas to be treated. For example, pressures in the contact zone may vary from one atmosphere up to one hundred fifty or even two hundred atmospheres. Pressures of from one atmosphere to about one hundred atmospheres are preferred. In the extraction zone and the regeneration or desorption zone or zones, pressures may be varied considerably, and will preferably range from about 0.5 atmosphere to about three of four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, and U.S. Pat. No. 4,009,251 to Meuly, issued Feb. 22, 1977, incorporated herein by reference. Preferably, pH in the process of the invention will be in the acid region, i.e., less than 7.

As indicated, the $H_2S$, when contacted, is rapidly converted in the process of the invention by the oxidizing polyvalent metal chelate of nitrilotriacetic acid, or mixtures thereof, to elemental sulfur. Since the chelates have limited solubility in many solvents or absorbents, if an absorbent is used, the polyvalent metal chelate or chelates of nitrilotriacetic acid are preferably supplied in admixture with the liquid absorbent and water. The amount of oxidizing polyvalent metal chelate, or mixtures thereof, supplied is an effective amount, i.e., an amount sufficient to convert all or substantially all of the $H_2S$ in the gas stream, and will generally be on the order of at least about two mol (basis polyvalent metal) per mol of $H_2S$ converted. Ratios of from about 2 mols to about 15 mols of polyvalent chelate (or chelates) per mol of $H_2S$ may be used, with ratios of from about 2 mols per mol to about 5 mols of polyvalent metal chelate or chelates per mol of $H_2S$ being preferred. The manner of preparing the admixture containing an absorbent is a matter of choice. For example, the chelate or chelates may be added to the absorbent, and if necessary, then water added. The amount of water added is not critical but must be sufficient to achieve solution of the polyvalent metal chelate or chelates, and can be determined by routine experimentation. Since the polyvalent chelate or chelates may have a significant solubility in the solvent, and since water is produced by the reaction of the $H_2S$ and the metal of the chelate(s), precise amounts of water to be added cannot be given. In the case of absorbents having a low solubility for the chelate, approximately 5 percent to 10 percent water by volume, based on the total volume of the absorbent mixture, will generally provide solvency. Preferably, however, the polyvalent metal chelate or chelates are added as an aqueous solution to the liquid absorbent. Where the reactant is supplied as an aqueous solution, the amount of solution supplied may be about 20 percent to about 80 percent by volume of the total absorbent admixture supplied to the absorption zone. An oxidizing polyvalent metal chelate solution will generally be supplied as an aqueous solution having a concentration of from about 0.1 molar to about 1 molar, and a concentration of about 1.0 molar is preferred. The ligand to metal molar ratio may range from 1.0 to 2.0, preferably 1.2 to 1.4.

As indicated, an oxidizing polyvalent metal chelate or chelates of nitrilotriacetic acid (NTA) are employed in the invention. Any oxidizing polyvalent metal, or mixtures thereof, for the chelate compound may be used, but iron, copper and manganese are preferred, particularly iron. The polyvalent metal should be capable of oxidizing hydrogen sulfide, while being reduced itself from a higher to a lower valence state, and should then be oxidizable from the lower valence state to the higher valence state in a typical redox reaction. Other polyvalent metals which may be used include lead, mercury, palladium, platinum, tungsten, nickel, chromium, cobalt, vanadium, titanium, tantalum, zirconium, molybdenum, and tin.

The absorbents employed in this invention are those liquid absorbents which have a high degree of selectivity in absorbing $CO_2$ (and preferably $H_2S$ as well) from the gaseous streams. Any of the known absorbents conventionally used which do not affect the activity of the polyvalent chelate, or mixtures thereof, and which exhibit sufficient solubility for the reactant or reactants may be employed. As indicated, the absorbent preferably has good absorbency for $H_2S$ as well, in order to assist in the removal of any $H_2S$ present in the gaseous streams. The particular absorbent chosen is a matter of choice, given these qualifications, and selection can be made by routine experimentation. For example, diethylene glycol mono ethyl-ether, propylene carbonate, tetra-ethylene glycol-dimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different $CO_2$-selective absorbents are known, or can be calculated by those skilled in the art.

A critical feature of the invention is the manner of removing the sulfur from the sulfur-containing admixture from the contacting zone (or from the regeneration zone). As noted, liquid compositions or compounds having the formula $C_nH_{2(n+1)}$, in which n is a whole number from 4 through 8, and mixtures thereof, may be used in extracting or removing the sulfur from the aqueous admixture. Useful compounds include n-butane, isobutane, n-pentane, isopentane, n-hexane, n-heptane, n-octane, and mixtures thereof. Preferably, the compounds employed are those wherein n is 5 through 8, and mixtures thereof, particularly those wherein n is 5 or 6, and mixtures thereof. It is not necessary that the composition(s) be pure, technical grades or mixtures being suitable, and the compositions may contain significant quantities of materials not conforming to the formula given provided that they do not interfere substantially with the effectiveness of the composition(s). The compound or compounds are supplied in an amount sufficient to remove at least the bulk of the sulfur from the admixture and form a separate phase comprising sulfur and the compound or mixture of compounds. Because the amount of the compound, or mixture of compounds, required is dependent on the amount of sulfur produced, which is, in turn, dependent on the concentration of $H_2S$ in the gas stream treated, precise amounts of the compounds cannot be given. Those skilled in the art may adjust the amount, as required. In general, the amount will range from about 1.0 percent to about 400 percent (by volume, based on the volume of the polyvalent metal chelate solution in contact therewith), with an amount of 5.0 percent to about 120 percent by volume being preferred. The solid sulfur in the admixture apparently is suspended preferentially in the compound, or mixture of compounds, and may be recovered easily. This result is surprising, since ordinary solid sulfur particles suspend very little, if at all, in the specified compounds or mixtures thereof. The manner of recovering the sulfur from the compound(s) is a matter of choice. As noted, if a significant layer of the liquid composition(s) employed forms above the solid sulfur-liquid mass, the liquid composition layer may simply be decanted. The sulfur-liquid composition mass may be withdrawn, e.g., by pumping, as a slurry, and the slurry may be separated in a separate zone, e.g., by melting, settling, filtration, or other techniques. Preferably, in such case, the sulfur slurry is heated sufficiently to melt the sulfur and flash the composition, the melted sulfur being easily decanted. It should be noted, that, in the extraction zone, if large amounts of sulfur are allowed to collect, the sulfurliquid "slurry" will actually "sink" past the nominal "interface" with the admixture or concentrated stream, even while maintaining separation.

Figure 2:
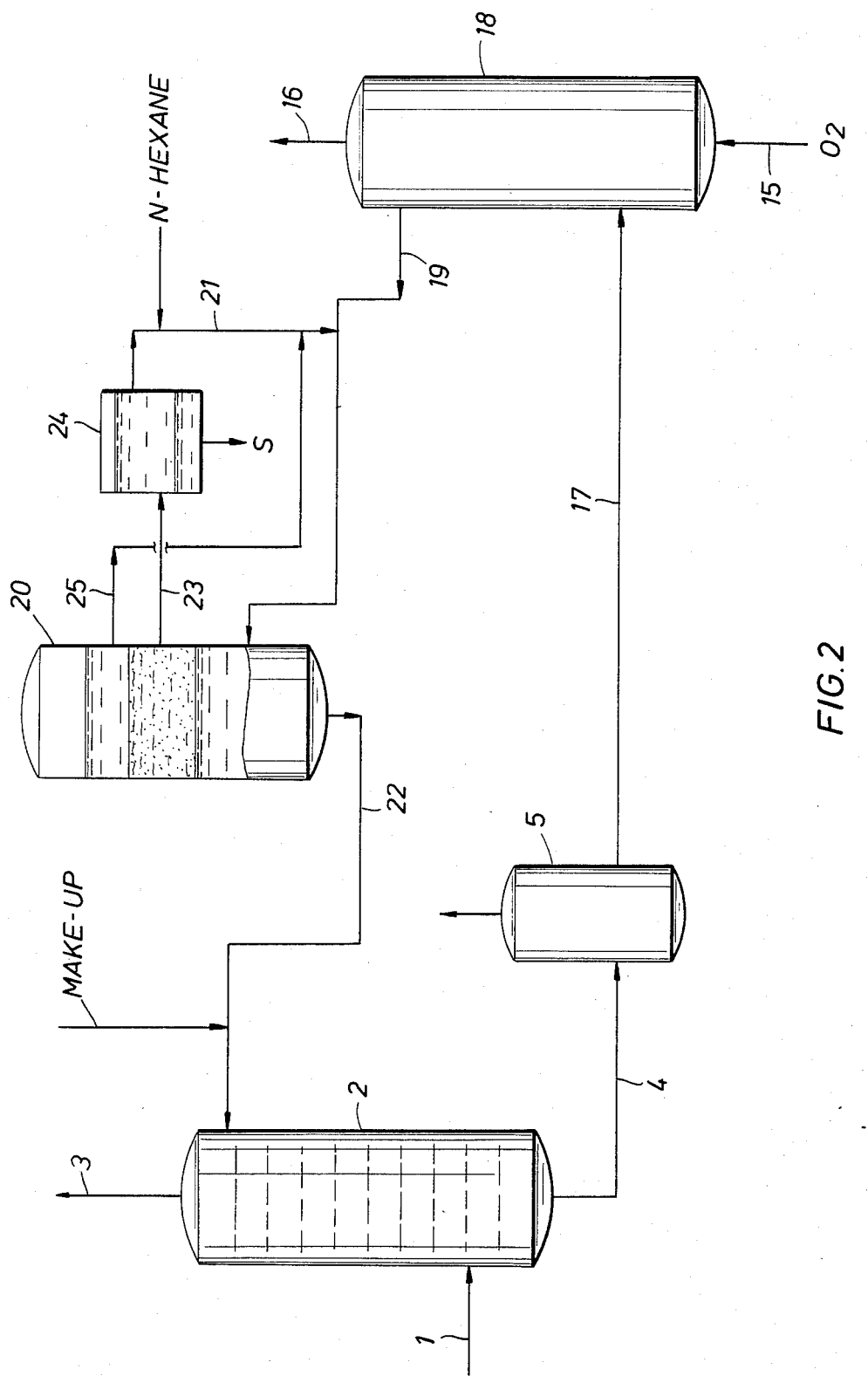

In order to describe the invention in greater detail, reference is made to the accompanying schematic drawing. The values given herein relating to temperatures, pressures, compositions, etc., are calculated or merely exemplary and should not be taken as delimiting the invention. FIG. 1 illustrates the first embodiment of the invention, wherein sulfur is removed prior to regeneration, while FIG. 2 illustrates the second embodiment, i.e., removal of the sulfur after regeneration.

In FIG. 1, sour gas, e.g., natural gas containing about 0.5 percent by volume $H_2S$, in line 1 enters contactor or column 2 (tray type) into which also enters an aqueous admixture comprising an aqueous 2.0 M solution of the Fe(III) chelate of nitrilotriacetic acid from line 16. The pressure of the feed gas is about 1200 p.s.i.g., and the temperature of the aqueous admixture is about 45° C. A contact time of about 120 seconds is employed in order to react all the $H_2S$. Purified or "sweet" gas leaves column 2 through line 3. The "sweet" gas is of a purity sufficient to meet standard requirements. In the admixture, the $H_2S$ is converted to elemental sulfur by the Fe(III) chelate, Fe(III) chelate in the process being converted to the Fe(II) chelate. The aqueous admixture, containing the elemental sulfur, is removed continuously and sent through line 4 to a depressurization and degassing unit 5, and then through line 6 to extraction unit 7. Prior to entry into unit 7, a stream of n-pentane in line 8 joins line 6 in such a fashion that good mixing of the aqueous admixture and the n-pentane occurs. For example, the streams may be mixed in a T-connection. The n-pentane may, of course, be added in unit 7, either wholly or in part, and the ratio of aqueous admixture to the n-pentane is approximately 1:1.

In unit 7, the n-pentane and aqueous admixture are allowed to separate into an upper n-pentane layer or phase, and a lower aqueous admixture layer. Surprisingly, even though sulfur normally has a density greater than 1.0, the sulfur may be said to "float" in the n-pentane, and is easily separated from the aqueous admixture. Large depths of a sulfur-rich zone in the n-pentane can be built without disturbing the separation of the aqueous phase and the n-pentane phase. This considerably facilitates design of the process equipment. The n-pentane sulfur mixture is removed from separator 7 via line 9 to a recovery zone or tank 10, where the sulfur may be removed by warming the mixture to the melting point of sulfur. Optionally, only a portion of the sulfur containing mass may be removed, a "clarified" portion of liquid composition being separated by decanting and recycled via line 11 so that only a portion of the upper mass need be heated. In any event, upon melting, as shown, the sulfur sinks to the bottom of tank 10 from whence it is easily removed. The n-pentane may be returned via line 8, and reused. The n-pentane may be flashed off in unit 10 and condensed to achieve even better separation. Excess heat in the solvent may be removed, preferably in 7 or 12, as desired. The lower aqueous layer in unit 7 is removed via line 12.

Although not shown, the admixture may be concentrated, as noted, with respect to sulfur before extraction with the compositions of the invention. In particular, prior to entry of the admixture into unit 7, the admixture may be separated into two portions, one portion being enriched with sulfur, the other, preferably the larger portion, being deleted in or substantially free from sulfur. For example, prior to extraction, the admixture may be sent to a separation step which comprises a unit, such as a centrifugal separator, for separating the admixture into two portions, the major portion or stream having a reduced sulfur content (which is sent to the regenerator) and a portion or stream having an increased sulfur content, this stream being sent to the extraction unit. As indicated, it is not necessary that all sulfur be removed from the major portion separated, and some sulfur retention may be beneficial. Preferably, the amount of sulfur removed in the separation step is simply balanced with the rate of sulfur intake in reactor 2, which is, of course, dependent on the amount of $H_2S$ in gas stream 1. Those skilled in the art may appropriately adjust the rates of withdrawal of the streams. Typically, the "concentrated" stream may comprise 10 percent by volume of the total volume of admixture in line 4. In regeneration zone or column 13 the admixture is contacted with excess air in line 14 to convert Fe(II) chelate in the admixture to the Fe(III) chelate. The temperature of the regeneration column is about 45° C., and pressure in the column is maintained at about 2 atmospheres. Spent air is removed from column 13 through line 15, while regenerated aqueous admixture is returned via line 16 to contactor 2.

As indicated, FIG. 1 illustrates the aspect of the invention wherein the extraction is carried out prior to regeneration. Removal of the sulfur after regeneration may be preferred in some instances, and may be accomplished by positioning of the extraction unit "after" the regeneration zone. Thus, in a separate embodiment, regenerated liquid, still containing sulfur, may be passed to units analogous or equivalent to units 7 and 10, sulfur recovered, and regenerated sulfur-free solution returned to contactor 2.

Accordingly, in FIG. 2, apparatus elements 1 through 4 correspond to similarly numbered elements shown in FIG. 1. The sulfur-containing liquid is passed, after degassing in 5, via line 17 to regenerator 18 where it is regenerated with air from 15, spent air being removed through 16, as previously described. The regenerated sulfur containing admixture is removed via line 19, and passed to extraction unit 20. Prior to entry into unit 20, the regenerated admixture is contacted, with, e.g., n-hexane, in a manner similar to that described in relation to the embodiment of FIG. 1, e.g., supplied via a mixing T connected to n-hexane supply line 21. Regenerated reactant solution is returned, via line 22 and to contactor 2. Sulfur-containing n-hexane is removed via line 23, and may be treated to recover sulfur and n-hexane, in unit 24, as described in relation to FIG. 1. As in the case of FIG. 1, only a portion of the sulfur containing mass may be removed, a "clarified" portion of liquid composition being separated by decanting and recycled via line 25 so that only a portion of the upper mass need be heated. Similarly, the regenerated admixture, prior to extraction, may be sent to a separation zone, such as a centrifugal separator, where it is separated into a regenerated reactant solution having reduced sulfur content and a sulfur-containing slurry. The regenerated reactant solution is returned via a separate line to contactor 2, while the slurry is removed and extracted.

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, a contacting column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, soldium thiosulfate and sodium acetate, which may be beneficial.

What is claimed is:

1. A process for the removal of $H_2S$ from a sour gaseous stream comprising
    (a) contacting the sour gaseous stream in a contacting zone with an aqueous reaction solution at a temperature below the melting point of sulfur, the solution comprising an effective amount of an oxidizing polyvalent metal chelate of nitrilotriacetic acid, or mixture of such chelates, to produce a sweet gas stream and an aqueous admixture containing sulfur and reduced reactant;

(b) removing aqueous admixture from the contacting zone;

(c) contacting aqueous admixture in an extraction zone with a liquid composition selected from compounds having the formula $C_nH_{2(n+1)}$, wherein n is a number from 4 through 8, and mixtures thereof, in an amount sufficient to remove at least the bulk of the sulfur from said admixture and form a separate phase containing sulfur and said composition, and forming a three phase mass comprising an upper mass containing solid sulfur and said liquid composition, and a lower phase in contact with said upper mass, said lower phase comprising aqueous admixture containing reduced reactant;

(d) separating at least a portion of the upper mass, and recovering sulfur from the portion separated;

(e) separating aqueous admixture containing reduced reactant from the lower phase, and regenerating said separated aqueous admixture in a regeneration zone to produce an aqueous admixture containing a regenerated reactant;

(f) returning aqueous admixture from the regeneration zone to the contacting zone.

2. The process of claim 1 wherein at least a portion of the liquid recovered from the upper mass separated in step (d) is, after sulfur removal, returned to the extraction zone.

3. The process of claim 1 wherein at least a portion of the liquid composition in the upper mass of step (c) is decanted and returned for contact with aqueous admixture.

4. A process for the removal of $H_2S$ from a sour gaseous stream comprising (a) contacting the sour gaseous stream in a contacting zone with an aqueous reaction solution at a temperature below the melting point of sulfur, the solution comprising an effective amount of an oxidizing polyvalent metal chelate of nitrilotriacetic acid, or mixture of such chelates, to produce a sweet gas stream and an aqueous admixture containing sulfur and reduced reactant;

(b) removing aqueous admixture from the contacting zone, and regenerating the aqueous admixture to produce a regenerated aqueous admixture containing a regenerated reactant and sulfur;

(c) contacting regenerated aqueous admixture in an extraction zone with a liquid composition selected from compounds having the formula $C_nH_{2(n+1)}$, wherein n is a whole number from 5 through 8, and mixtures thereof, in an amount sufficient to remove at least the bulk of the sulfur from said regenerated aqueous admixture and form a separate phase containing sulfur and said composition, and forming a three phase mass comprising an upper mass containing solid sulfur and said liquid composition, and a lower phase in contact with said upper mass, said lower phase comprising regenerated aqueous reaction solution;

(d) separating at least a portion of the upper mass, and recovering sulfur from the portion separated;

(e) separating regenerated aqueous reaction solution from the lower phase, and returning regenerated aqueous reaction solution to the contacting zone.

5. The process of claim 4 wherein at least a portion of the liquid recovered from the upper mass separated in step (d) is, after sulfur removal, returned to the extraction zone.

6. The process of claim 4 wherein at least a portion of the liquid composition in the upper mass of step (c) is decanted and returned for contact with aqueous admixture.

7. The process of claim 1 wherein the oxidizing polyvalent metal chelate compound is the Fe(III) chelate of nitrilotriacetic acid.

8. The process of claim 2 wherein the oxidizing polyvalent metal chelate compound is the Fe(III) chelate of nitrilotriacetic acid.

9. The process of claim 3 wherein the oxidizing polyvalent metal chelate compound is the Fe(III) chelate of nitrilotriacetic acid.

10. The process of claim 4 wherein the oxidizing polyvalent metal chelate compound is the Fe(III) chelate of nitrilotriacetic acid.

11. The process of claim 5 wherein the oxidizing polyvalent metal chelate compound is the Fe(III) chelate of nitrilotriacetic acid.

12. The process of claim 6 wherein the oxidizing polyvalent metal chelate compound is the Fe(III) chelate of nitrilotriacetic acid.

13. A process for the removal of $H_2S$ from a sour gaseous stream comprising (a) contacting the sour gaseous stream in a contacting zone with an aqueous reaction solution at a temperature below the melting point of sulfur, the solution comprising an effective amount of an oxidizing polyvalent metal chelate of nitrilotriacetic acid, or mixture of such chelates, to produce a sweet gas stream and an aqueous admixture containing sulfur and reduced reactant;

(b) removing aqueous admixture from the contacting zone;

(c) separating removed aqueous admixture into an aqueous reactant solution having reduced sulfur content and an aqueous reactant slurry containing increased sulfur content; and regenerating aqueous reactant solution having reduced sulfur content and producing regenerated reaction solution, and returning regenerated reaction solution to the contacting zone;

(d) concomitantly contacting aqueous reactant slurry in an extraction zone with a liquid composition selected from compounds having the formula $C_nH_{2(n+1)}$, wherein n is a number from 4 through 8, and mixtures thereof, in an amount sufficient to remove at least the bulk of the sulfur from said slurry and form a separate phase containing sulfur and said composition, and forming a three phase mass comprising an upper mass containing solid sulfur and said liquid composition, and a lower phase in contact with said upper mass, said lower phase comprising aqueous admixture containing reduced reactant;

(e) separating at least a portion of the upper mass, and recovering sulfur from the portion separated;

(f) separating aqueous admixture containing reduced reactant from the lower phase, and regenerating said separated aqueous admixture in a regeneration zone to produce an aqueous admixture containing a regenerated reactant;

(g) returning aqueous admixture from the regeneration zone to the contacting zone.

14. The process of claim 13 wherein at least a portion of the liquid recovered from the upper mass separated in step (e) is, after sulfur removal, returned to the extraction zone.

15. The process of claim 13 wherein at least a portion of the liquid composition in the upper mass of step (c) is decanted and returned for contact with aqueous admixture.

16. A process for the removal of H$_2$S from a sour gaseous stream comprising
   (a) contacting the sour gaseous stream in a contacting zone with an aqueous reaction solution at a temperature below the melting point of sulfur, the solution comprising an effective amount of an oxidizing polyvalent metal chelate of nitrilotriacetic acid, and mixtures of such chelates, to produce a sweet gas stream and an aqueous admixture containing sulfur and reduced reactant;
   (b) removing aqueous admixture from the contacting zone, and regenerating the aqueous admixture to produce a regenerated aqueous admixture containing a regenerated reactant and sulfur;
   (c) separating the regenerated aqueous admixture into a regenerated aqueous reaction solution having a reduced sulfur content and a regenerated aqueous reactant slurry containing increased sulfur content;
   (d) contacting regenerated aqueous reactant slurry in an extraction zone with a liquid composition selected from compounds having the formula $C_nH_{2(n+1)}$, wherein n is a whole number from 4 through 8, and mixtures thereof, in an amount sufficient to remove at least the bulk of the sulfur from said regenerated reactant slurry and form a separate phase containing sulfur and said composition, and forming a three phase mass comprising an upper mass containing solid sulfur and said liquid composition, and a lower phase in contact with said upper mass, said lower phase comprising regenerated aqueous reaction solution;
   (e) separating at least a portion of the upper mass and recovering sulfur from the portion separated;
   (f) separating regenerated aqueous reaction solution from the lower phase, and returning regenerated aqueous reaction solution to the contacting zone.

17. The process of claim 16 wherein at least a portion of the upper mass separated in step (e) is, after sulfur removal, returned to the extraction zone.

18. The process of claim 16 wherein at least a portion of the liquid composition in the upper mass of step (c) is decanted and returned for contact with aqueous admixture.

19. The process of claim 13 wherein the oxidizing polyvalent metal chelate compound is the Fe(III) chelate of nitrilotriacetic acid.

20. The process of claim 14 wherein the oxidizing polyvalent metal chelate compound is the Fe(III) chelate of nitrilotriacetic acid.

21. The process of claim 15 wherein the oxidizing polyvalent metal chelate compound is the Fe(III) chelate of nitrilotriacetic acid.

22. The process of claim 16 wherein the oxidizing polyvalent metal chelate compound is the Fe(III) chelate of nitrilotriacetic acid.

23. The process of claim 17 wherein the oxidizing polyvalent metal chelate compound is the Fe(III) chelate of nitrilotriacetic acid.

24. The process of claim 18 wherein the oxidizing polyvalent metal chelate compound is the Fe(III) chelate of nitrilotriacetic acid.

* * * * *